Aug. 15, 1967  W. H. RAMSDELL  3,336,091
BEARING ASSEMBLY
Filed Sept. 28, 1964
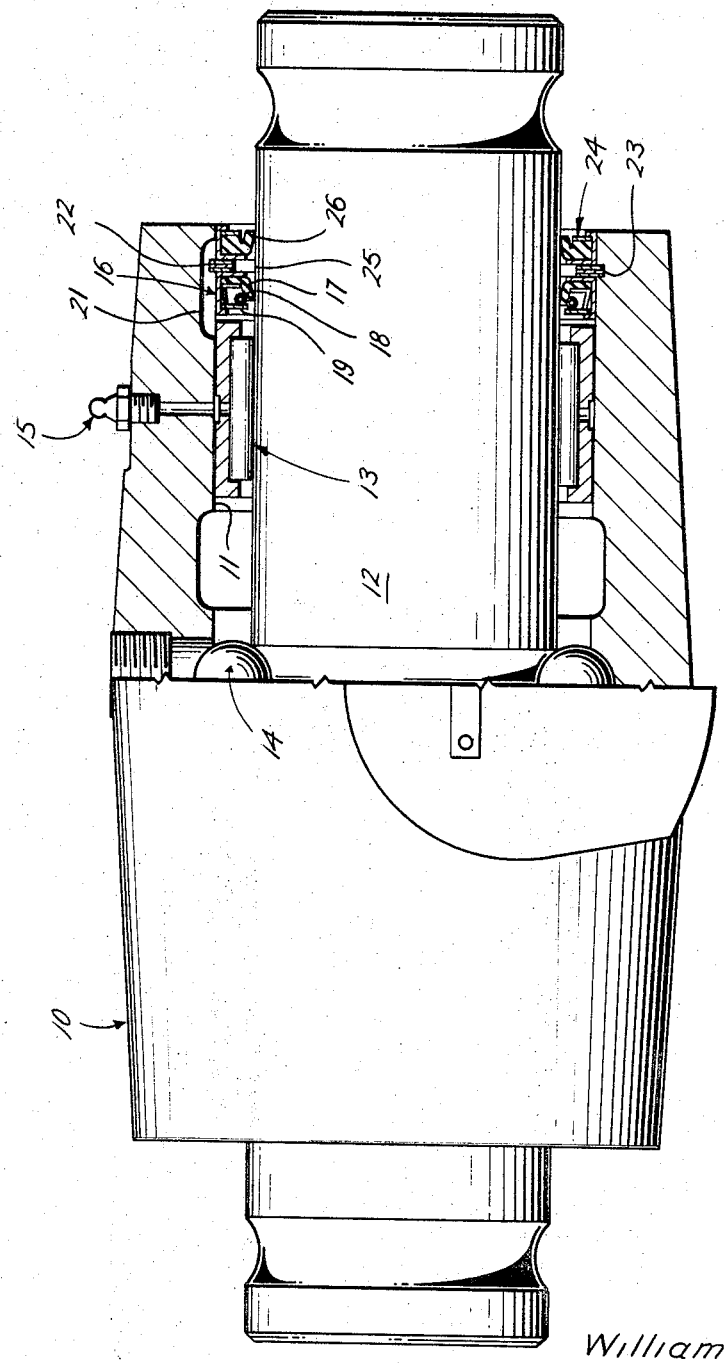
William H. Ramsdell
INVENTOR
BY
ATTORNEYS

United States Patent Office 3,336,091
Patented Aug. 15, 1967

3,336,091
BEARING ASSEMBLY
William H. Ramsdell, Houston, Tex., assignor to The Youngstown Sheet and Tube Company, Boardman, Ohio, a corporation of Ohio
Filed Sept. 28, 1964, Ser. No. 399,776
4 Claims. (Cl. 308—36.1)

This invention relates to bearing assemblies, and more particularly to an improvement in the grease seal assembly for retaining grease in the bearing.

In structures employing positive seals, it has been customary to provide a bleed opening to permit loss of excess grease and thus prevent the grease seal being pumped out of the assembly by use of high pressure grease guns. This has not been entirely successful because the bleed openings were closed by spring loaded check valves which sometimes stick in either open or closed position. When stuck open, grease would move to the relief instead of the bearing. When stuck closed, the grease seal would sometimes be pumped out of the housing.

These seals have generally also included dust seals and no provision has been made for flushing out dust which makes its way past the dust seal.

Dust seals previously utilized have tended to run dry, resulting in rapid wear. In some instances special materials, such as felt, have been used. These special materials do not generally provide a tight fit with the shaft.

It is an object of this invention to provide a bearing assembly that overcomes the above deficiencies.

Another object is to provide a bearing assembly in which the bearing and dust seal are positively flushed each time the bearing is greased.

Another object is to provide a bearing assembly in which a passageway is provided for relieving pressure within the assembly which positively relieves pressure and does not require a spring loaded check valve.

Another object is to provide a bearing assembly in which the dust seal provides the valve for closing the grease relief passageway.

Another object is to provide a lubricated dust seal which does not require special materials, which may tightly fit a moving shaft, and which will have a substantial service life.

Other objects, features and advantages of the invention will be apparent from the specification, drawings and claims.

In the drawing, wherein like reference numerals indicate like parts, the single figure is a view partly in elevation and partly in cross-section of the equalizer bearing assembly for pumping units of the type utilized in pumping oil wells.

The bearing assembly includes a housing indicated generally at 10 having a bore 11 therethrough. Everything on opposite sides of the center line through the drawing is identical and only one side of the drawing will be explained in detail.

Within the bore 11 a shaft 12 is mounted for rotation by the roller bearings indicated generally at 13 and the thrust ball bearings indicated generally at 14. In accordance with the usual custom, an access port to the ball bearing race is utilized to load the ball bearings into the race. After the balls are loaded, this port is closed.

The roller bearing 13 is conventional in form and is press-fitted within housing 10.

Located over the roller bearing is a suitable conventional grease fitting indicated generally at 15 for introducing grease into the bore and forcing the grease through the roller bearing 13. The fitting is so located to insure flushing at least half of the roller bearing 13 because the assembly is open at both ends. Where the housing has only one end open, the grease fitting would be located inboard of the bearing 13 to insure flushing the entire bearing.

Press-fitted within the bore 11, immediately outboard of the bearing 13 and spaced slightly therefrom, is a grease seal 16. This grease seal may take any desired form which will function to positively retain grease within the bearing. Preferably, the grease seal includes an inwardly projecting lip-type seal 17 which may be formed of any desired resilient material such as natural or synthetic rubber. This grease seal is positively held against the shaft by a garter spring 18 held against the lip member 17 by the retainer 19.

A suitable passageway 21 is provided in the housing which bypasses the grease seal 16. This passageway interconnects the bore through the housing on opposite sides of the grease seal and provides communication between the space between the bearing and grease seal and the bore outboard of the grease seal. With this arrangement grease introduced through the fitting 15 will pass through the roller bearing 13 into the space between the roller bearing and the grease seal which act as a gathering ring, and thence through passageway 21 to the bore exterior of the grease seal. In this manner, the roller bearing will be flushed and excess pressure within bore 11 will be relieved.

Outboard of grease seal 16 a suitable retainer ring 22 is provided in slot 23 in the bore of the housing. This ring may take any desired form and, in the illustrated embodiment, is a spirally-wound flat spring member which may be reduced in diameter for inserting and removing, and, when released, will spring out into the configuration shown to hold the seal 16 in place. This ring also provides a spacer to space the seal ring 16 from the dust seal which is indicated generally at 24.

Dust seal 24 has a pressure-tight fit with the housing 10 to seal between the housing and the dust seal. The dust seal is positioned outboard of the outer end of relief passage 21 so that as grease passes through the relief passage 21 it will gather in the gathering space or annulus 25.

The dust seal 24 preferably includes an outwardly projecting lip-type seal 26 which may be made from any suitable material such as rubber or synthetic rubber. This lip-type seal inhibits ingress of dust, water and other matter, while at the same time bending outwardly and away from the shaft 12 to permit excess grease within passageway 25 to bypass the dust seal to the exterior of the shaft and flush the space between the two seals.

As the assembly is greased from time to time new grease will flow through the bearing and passageway and will force the old grease out from the assembly and past the dust seal lip 26. This will flush out the bearing and will also flush out any dust which might have made its way past the dust seal 24.

Inasmuch as the passageway 21, which functions as a relief passageway, is protected against the entry of dust by a valve, the dust seal, which cannot stick, there is little or no tendency to force the grease seal out of position with a high pressure grease gun.

The foregoing disclosure and description of the invention is illustrative and explanatory thereof, and various changes in the size, shape and materials, as well as in the details of the illustrated construction, may be made within the scope of the appended claims without departing from the spirit of the invention.

What is claimed is:
1. A assembly comprising,
a housing having a bore opening to the exterior of the housing,
a shaft in said bore, bearing means mounting said shaft in said bore,
grease seal means between said housing and shaft outboard of the bearing means,
a passageway bypassing said grease seal means and interconnecting the bore on opposite sides of the grease seal means,
resilient dust seal means between said housing and shaft and outboard of said passageway effective to exclude dust with said shaft at rest and with said shaft rotating in either direction, said dust seal means inhibiting entry of matter from the exterior thereof while permitting passage of grease from said passageway,
and grease fitting means communicating with said passageway through said bearing means whereby introduction of grease into said grease fitting means flushes said bearing means and excess grease flushes said dust seal means.

2. An assembly comprising,
a housing having a bore opening to the exterior of the housing,
a shaft in said bore,
bearing means mounting said shaft in said bore,
grease seal means between said housing and shaft outboard of the bearing means,
a passageway bypassing said grease seal means and interconnecting the bore on opposite sides of the grease seal means,
resilient dust seal means between said housing and shaft and outboard of said passageway effective to exclude dust with said shaft at rest and with said shaft rotating in either direction, said dust seal means inhibiting entry of matter from the exterior thereof while permitting passage of grease from said passageway,
means selectively preventing removal of said grease seal means and separating said grease and dust seal means,
and grease fitting means communicating with said passageway through said bearing means whereby introduction of grease into said grease fitting means flushes said bearing means and excess grease flushes said dust seal means.

3. An assembly comprising,
a housing having a bore opening to the exterior of the housing,
a shaft in said bore,
bearing means mounting said shaft in said bore,
grease seal means sealingly engaging said housing bore and having an inwardly projecting resilient lip-type seal in sealing engagement with said shaft,
a passageway bypassing said grease seal means and interconnecting the bore on opposite sides of the grease seal means,
dust seal means sealingly engaging said housing bore outboard of said passageway and having an outwardly projecting resilient lip-type seal in sealing engagement with said shaft to prevent ingress of matter with said shaft at rest and with said shaft rotating in either direction while permitting egress of grease from said passageway,
and grease fitting means communicating with said passageway through said bearing means whereby introduction of grease into said grease fitting means flushes said bearing means and excess grease flushes said dust seal means.

4. An assembly comprising,
a housing having a bore opening to the exterior of the housing,
a shaft in said bore,
bearing means mounting said shaft in said bore,
grease seal means sealingly engaging said housing bore and having an inwardly projecting resilient lip-type seal in sealing engagement with said shaft,
a passageway bypassing said grease seal means and interconnecting the bore on opposite sides of the grease seal means,
dust seal means sealingly engaging said housing bore outboard of said passageway and having an outwardly projecting resilient lip-type seal in sealing engagement with said shaft to prevent ingress of matter with said shaft at rest and with said shaft rotating in either direction while permitting egress of grease from said passageway,
means selectively preventing removal of said grease seal means and separating said grease and dust seal means,
and grease fitting means communicating with said passageway through said bearing means whereby introduction of grease into said grease fitting means flushes said bearing means and excess grease flushes said dust seal means.

References Cited
UNITED STATES PATENTS

| | | | |
|---|---|---|---|
| 1,493,598 | 5/1934 | Buckwalter | 308—36.1 X |
| 2,626,839 | 1/1953 | Creson et al. | 308—36.1 |
| 3,051,399 | 8/1962 | Stauffer | 308—36.1 X |
| 3,142,520 | 7/1964 | Mueller | 308—187.2 |

MARTIN P. SCHWADRON, *Primary Examiner.*

R. F. HESS, *Assistant Examiner.*